United States Patent
Nielsen

(10) Patent No.: US 9,191,704 B2
(45) Date of Patent: Nov. 17, 2015

(54) METHODS AND SYSTEMS FOR REDUCING CREDITING ERRORS DUE TO SPILLOVER USING AUDIO CODES AND/OR SIGNATURES

(71) Applicant: Christen V. Nielsen, Palm Harbor, FL (US)

(72) Inventor: Christen V. Nielsen, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 11 days.

(21) Appl. No.: 13/828,702

(22) Filed: Mar. 14, 2013

(65) Prior Publication Data

US 2014/0282640 A1    Sep. 18, 2014

(51) Int. Cl.
  *H04N 21/422* (2011.01)
  *H04N 21/439* (2011.01)
  *H04N 21/442* (2011.01)

(52) U.S. Cl.
  CPC .................................. *H04N 21/442* (2013.01)

(58) Field of Classification Search
  None
  See application file for complete search history.

(56) References Cited

U.S. PATENT DOCUMENTS

| | | | |
|---|---|---|---|
| 3,056,135 A | 9/1962 | Currey et al. | |
| 3,742,359 A * | 6/1973 | Behymer | 381/315 |
| 4,107,734 A | 8/1978 | Percy et al. | |
| 4,382,291 A | 5/1983 | Nakauchi | |
| 4,626,904 A | 12/1986 | Lurie | |
| 4,644,509 A | 2/1987 | Kiewit et al. | |
| 4,695,879 A | 9/1987 | Weinblatt | |
| 4,718,106 A | 1/1988 | Weinblatt | |
| 4,769,697 A | 9/1988 | Gilley et al. | |
| 4,779,198 A | 10/1988 | Lurie | |
| 4,930,011 A | 5/1990 | Kiewit | |

(Continued)

FOREIGN PATENT DOCUMENTS

| | | |
|---|---|---|
| EP | 1213860 | 4/2008 |
| GB | 2260246 | 7/1993 |

(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

(Continued)

*Primary Examiner* — Brian T Pendleton
*Assistant Examiner* — Jean D Saint Cyr
(74) *Attorney, Agent, or Firm* — Hanley, Flight & Zimmerman, LLC

(57) ABSTRACT

Methods, apparatus, and articles of manufacture for reducing exposure crediting errors due to spillover in a media monitoring system are disclosed. An example method includes determining if first media monitoring data provided from a first meter identifies a same media as second media monitoring data provided from a second meter. If the first media monitoring data identifies the same media as the second media monitoring data, the example method includes detecting if spillover occurred by determining if an absolute value of a difference between a first timestamp associated with the first media monitoring data and a second timestamp associated with the second media monitoring data is less than a threshold. If spillover occurred, the example method includes determining which of the first media monitoring data or the second media monitoring data to credit as a media exposure.

30 Claims, 7 Drawing Sheets

(56) References Cited

U.S. PATENT DOCUMENTS

| | | |
|---|---|---|
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,285,498 A | 2/1994 | Johnston |
| 5,382,970 A | 1/1995 | Kiefl |
| 5,387,993 A | 2/1995 | Heller et al. |
| 5,404,377 A | 4/1995 | Moses |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,574,962 A | 11/1996 | Fardeau et al. |
| 5,579,124 A | 11/1996 | Aijala et al. |
| 5,581,800 A | 12/1996 | Fardeau et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,774,876 A | 6/1998 | Woolley et al. |
| 5,787,334 A | 7/1998 | Fardeau et al. |
| 5,793,409 A | 8/1998 | Tetsumura |
| 5,812,930 A | 9/1998 | Zavrel |
| 5,815,114 A | 9/1998 | Speasl et al. |
| 5,872,588 A | 2/1999 | Aras et al. |
| 5,884,278 A | 3/1999 | Powell |
| 5,893,093 A | 4/1999 | Wills |
| 5,982,808 A | 11/1999 | Otto |
| 6,002,918 A | 12/1999 | Heiman et al. |
| 6,035,177 A | 3/2000 | Moses et al. |
| 6,091,956 A | 7/2000 | Hollenberg |
| 6,098,048 A | 8/2000 | Dashefsky et al. |
| 6,243,739 B1 | 6/2001 | Schwartz et al. |
| 6,252,522 B1 | 6/2001 | Hampton et al. |
| 6,359,557 B2 | 3/2002 | Bilder |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,467,089 B1 | 10/2002 | Aust et al. |
| 6,470,264 B2 | 10/2002 | Bide |
| 6,493,649 B1 | 12/2002 | Jones et al. |
| 6,497,658 B2 | 12/2002 | Roizen et al. |
| 6,563,423 B2 | 5/2003 | Smith |
| 6,577,238 B1 | 6/2003 | Whitesmith et al. |
| 6,647,548 B1 | 11/2003 | Lu et al. |
| 6,654,800 B1 | 11/2003 | Rieger, III |
| 6,731,942 B1 | 5/2004 | Nageli |
| 6,748,317 B2 | 6/2004 | Maruyama et al. |
| 6,766,524 B1 | 7/2004 | Matheny et al. |
| 6,842,877 B2 | 1/2005 | Robarts et al. |
| 6,882,837 B2 | 4/2005 | Fernandez et al. |
| 6,888,457 B2 | 5/2005 | Wilkinson et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,046,162 B2 | 5/2006 | Dunstan |
| 7,047,548 B2 | 5/2006 | Bates et al. |
| 7,076,441 B2 | 7/2006 | Hind et al. |
| 7,080,061 B2 | 7/2006 | Kabala |
| 7,099,676 B2 | 8/2006 | Law et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,222,071 B2 | 5/2007 | Neuhauser et al. |
| 7,295,108 B2 | 11/2007 | Corrado et al. |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,739,705 B2 | 6/2010 | Lee et al. |
| 7,792,660 B2 | 9/2010 | Iyengar |
| 8,239,887 B2 | 8/2012 | Gilboa et al. |
| 8,245,249 B2 | 8/2012 | Lee |
| 8,266,644 B2 | 9/2012 | Randolph et al. |
| 8,738,763 B2 | 5/2014 | Crystal et al. |
| 2002/0059218 A1 | 5/2002 | August et al. |
| 2002/0068556 A1 | 6/2002 | Brown |
| 2002/0097885 A1 | 7/2002 | Birchfield et al. |
| 2002/0144259 A1 | 10/2002 | Gutta et al. |
| 2002/0150387 A1 | 10/2002 | Kunii et al. |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0122679 A1 | 6/2004 | Neuhauser et al. |
| 2004/0198386 A1 | 10/2004 | Dupray |
| 2004/0218701 A1 | 11/2004 | Singh et al. |
| 2004/0266457 A1 | 12/2004 | Dupray |
| 2005/0035857 A1 | 2/2005 | Zhang et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0244011 A1 | 11/2005 | Kim |
| 2005/0264430 A1 | 12/2005 | Zhang et al. |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2007/0011040 A1 | 1/2007 | Wright et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0101454 A1 | 5/2008 | Luff et al. |
| 2008/0130906 A1 | 6/2008 | Goldstein et al. |
| 2008/0204273 A1 | 8/2008 | Crystal et al. |
| 2009/0037575 A1 | 2/2009 | Crystal et al. |
| 2009/0133058 A1 | 5/2009 | Kouritzin et al. |
| 2009/0169024 A1 | 7/2009 | Krug et al. |
| 2010/0199296 A1* | 8/2010 | Lee et al. ............ 725/14 |
| 2011/0019835 A1 | 1/2011 | Schmidt et al. |
| 2011/0091055 A1 | 4/2011 | LeBlanc |
| 2012/0148058 A1* | 6/2012 | Chen ............ 381/58 |
| 2012/0148067 A1 | 6/2012 | Petersen et al. |

(56) References Cited

U.S. PATENT DOCUMENTS

| | | | |
|---|---|---|---|
| 2012/0169359 A1 | 7/2012 | Kim et al. | |
| 2012/0219156 A1 | 8/2012 | Ramaswamy et al. | |
| 2013/0034244 A1 | 2/2013 | Van Raalte et al. | |
| 2013/0166050 A1 | 6/2013 | Duwenhorst | |
| 2014/0126746 A1 | 5/2014 | Shin et al. | |

FOREIGN PATENT DOCUMENTS

| | | |
|---|---|---|
| GB | 2292506 | 2/1996 |
| JP | 2000224617 | 8/2000 |
| JP | 2000307530 | 11/2000 |
| JP | 2003061027 | 2/2003 |
| JP | 2003125102 | 4/2003 |
| JP | 2003279400 | 10/2003 |
| JP | 2005322262 | 11/2005 |
| JP | 2006215774 | 8/2006 |
| JP | 2010257278 | 11/2010 |
| JP | 2012507904 | 3/2012 |
| JP | 2012095014 | 5/2012 |
| JP | 2012242214 | 12/2012 |
| KR | 20020000288 | 1/2002 |
| KR | 100911679 | 8/2009 |
| KR | 1020100048330 | 5/2010 |
| KR | 20120067477 | 6/2012 |
| KR | 20120131826 | 12/2012 |
| WO | 8810540 | 12/1988 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 02097791 | 12/2002 |
| WO | 03087871 | 10/2003 |
| WO | 2004051303 | 6/2004 |
| WO | 2004051304 | 6/2004 |
| WO | 2006037014 | 4/2006 |
| WO | 2006096177 | 9/2006 |
| WO | 2006121681 | 11/2006 |
| WO | 2010049809 | 5/2010 |

OTHER PUBLICATIONS

Bernstein et al., "An Introduction to Map Matching for Personal Navigation Assistants," New Jersey TIDE Center, New Jersey Institute of Technology, Aug. 1996 (17 pages).
Kerschbaumer, Ken, "Who's Really Watching?" PricewaterhouseCoopers Global Entertainment and Medai Outlook 2004-2008, May 16, 2005 (4 pages).
McCarthy et al., "RF Free Ultrasonic Positioning," Department of Computer Science, University of Bristol, U.K., 2003 (7 pages).
McCarthy et al., "RF Free Ultrasonic Positioning (Presentation)," 7th International Symposiom on Wearable Computers, Oct. 2003 (12 pages).
Gentile et al., "Robust Location using System Dynamics and Motion Constraints," National Institute of Standards and Technology, Wireless Communication Technologies Group, Jun. 24, 2004 (5 pages).
Cricket Project, "Cricket v2 User Manual," MIT Computer Science and Artificial Intelligence Lab, Cambridge, U.S.A., Jan. 2005 (57 pages).
Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).
"The Nibble Location System," [online]. UCLA, May 21, 2001 [retrieved on Nov. 2, 2004]. Retrieved from the Internet: <URL: http://mmsl.cs.ucla.edu/nibble/>. (13 pages).
"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).
"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).
Ferguson, Michael, "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).
"FM Wireless Microphone Module Kits," [online]. Horizon Industries, 2004 [retrieved on Sep. 30, 2004]. Retrieved from the Internet: <URL: www.horizonindustries.com/fm.htm>. (1 page).
"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).
"Dust Networks—SmartMesh," [online]. Dust Networks Inc., 2002 [retrieved on Sep. 29, 2004]. Retrieved from the Internet: <URL: www.dustnetworks.com>. (2 pages).
Kanellos, Michael, "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).
"UHF Radio Data Logging System—GenII Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).
"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).
"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).
"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).
"X1 Button Radio—The World's Smallest Radio," [online]. Exxun, 2004 [retrieved on Sep. 29, 2004]. Retrieved from the Internet: <URL: www.exxun.com>. (2 pages).
"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).
Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).
"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).
"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).
Patent Cooperation Treaty, "Search Report," issued on Oct. 31, 2006 in corresponding PCT application No. PCT/US05/34743 (4 pages).
Patent Cooperation Treaty, "Search Opinion" issued on Oct. 31, 2006 in corresponding PCT application No. PCT/US05/34743 (9 pages).
Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).
Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (7 pages).
Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

(56) References Cited

OTHER PUBLICATIONS

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons," Technical Report MSR-TR-2000-12 Microsoft Research, [retrieved from internet, http://research.microsoft.com/~bahl/Papers/Pdf/radar.pdf] Feb. 2000 (13 pages).

Wagner, David P. Batelle. Report: Lexington Area Travel Data Collection Test; GPS for Personal Travel Surveys. Final Report for Office of Highway Information Management, Office of Technology Application and Federal Highway Administration, Sep. 1997 (92 pages).

United States Patent and Trademark Office, "Notice of Allowance," issued in connection with U.S. Appl. No. 11/692,087, on Jan. 12, 2010 (8 pages).

United States Patent and Trademark Office, "Interview Summary," issued in connection with U.S. Appl. No. 11/692,087, on Dec. 11, 2009 (3 pages).

United States Patent and Trademark Office, "Final Rejection," issued in connection with U.S. Appl. No. 11/692,087, on Oct. 30, 2009 (15 pages).

United States Patent and Trademark Office, "Non-Final Office Action," issued in connection with U.S. Appl. No. 11/692,087, on May 13, 2009 (11 pages).

Patent Cooperation Treaty, "International Search Report," issued in connection with International Application No. PCT/US2014/022704, Jun. 25, 2014 (3 pages).

Patent Cooperation Treaty, "Written Opinion" issued in connection with International Application No. PCT/US2014/022704, Jun. 25, 2014 (5 pages).

Canadian Intellectual Property Office, "Examination Report," issued in connection with Canadian Patent Application No. 2,875,592, on Mar. 30, 2015 (5 pages).

IP Australia, "Patent Examination Report No. 2," issued in connection with Australian Patent Application No. 2013204919 on Aug. 30, 2015, (2 pages).

\* cited by examiner

_US 9,191,704 B2_

METHODS AND SYSTEMS FOR REDUCING CREDITING ERRORS DUE TO SPILLOVER USING AUDIO CODES AND/OR SIGNATURES

FIELD OF THE DISCLOSURE

The present disclosure relates generally to media monitoring and, more particularly, to methods and systems for reducing crediting errors due to spillover using audio codes and/or signatures.

BACKGROUND

Audience measurement of media, such as television, music, movies, radio, Internet websites, streaming media, etc., is typically carried out by monitoring media exposure of panelists that are statistically selected to represent particular demographic groups. Using various statistical methods, the captured media exposure data is processed to determine the size and demographic composition of the audience(s) for programs of interest. The audience size and demographic information is valuable to advertisers, broadcasters and/or other entities. For example, audience size and demographic information is a factor in the placement of advertisements, as well as a factor in valuing commercial time slots during a particular program.

DETAILED DESCRIPTION

Figure 1:
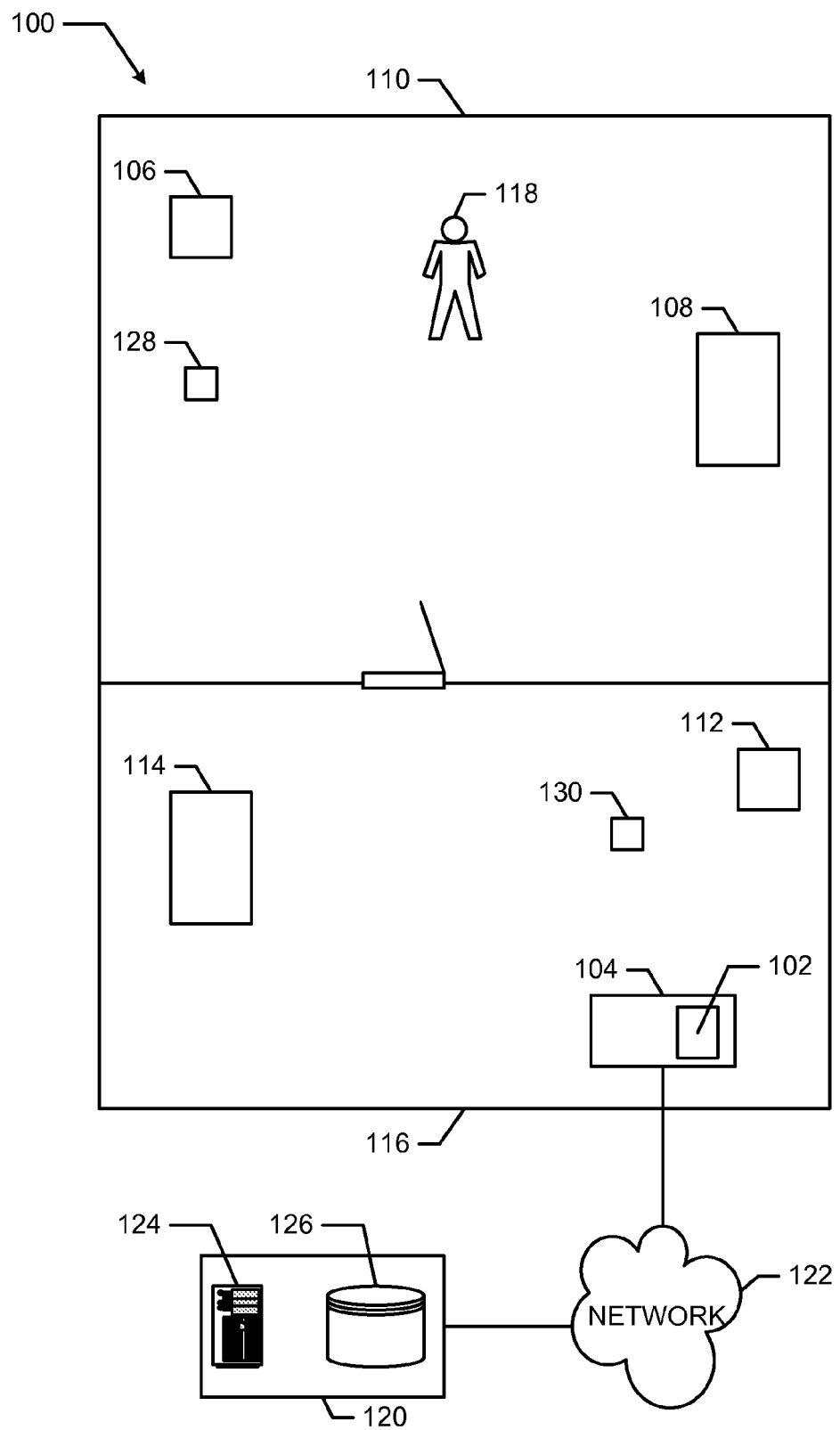
FIG. 1 illustrates an example system including an example spillover manager implemented in accordance with the teachings of this disclosure to manage spillover to reduce media monitoring inaccuracies in the system.

Audience measurement companies enlist persons to participate in measurement panels. Such persons (e.g., panelists) agree to allow the audience measurement company to measure their exposure to media (e.g., television programming, radio programming, Internet, advertising, signage, outdoor advertising, etc.). In order to associate media monitoring data (i.e., data reflecting media presentation) with panelist demographics, the audience measurement company monitors media device(s) and/or panelist(s) using meters.

In some examples, meters (e.g., stationary meters) are placed with and/or near media presentation devices (e.g., televisions, stereos, speakers, computers, etc.) within a home or household. For example, a meter may be placed in a room with a television and another meter may be placed in a different room with another television. In some examples, personal portable metering devices (PPMs), which are also known as portable metering devices or portable personal (or people) meters, are used to monitor media exposure of panelists. A PPM is an electronic device that is typically worn (e.g., clipped to a belt or other apparel) or carried by a panelist. The term "meter" as used herein refers generally to stationary meters and/or portable meters.

In general, media identifying meters are configured to use a variety of techniques to monitor media presentations at media presentation devices and/or exposure of panelists to media presentations. For example, one technique for monitoring media exposure involves detecting or collecting media identifying information (e.g., codes (e.g., watermarks), signatures, etc.) from media signals (e.g., audio and/or video signals) that are emitted or presented by media presentation devices.

As media (e.g., content and/or advertisements) is presented, a media identifying meter may receive media signals (e.g., via a microphone) associated with the media and may detect media (e.g., audio and/or video) information associated with the media to generate media monitoring data. In general, media monitoring data may include any information that is representative of (or associated with) media and/or that may be used to identify a particular media presentation (e.g., a song, a television program, a movie, a video game, an advertisement, etc.). For example, the media monitoring data may include signatures that are collected or generated by the media identifying meter based on the media, audio codes that are broadcast simultaneously with (e.g., embedded in) the media, etc. Each media identifying meter may receive different media signals based on the media presented (e.g., tuned) on the media presentation devices to which panelists are exposed.

Media monitoring systems may also include one or more people meters to identify panelists in a monitored audience. Identifying the panelists in the audience allows mapping of their demographics to the media. Panelists provide their demographic information when they agree to be monitored by the audience measurement system. Any method of people metering may be employed. For example, the people metering may be active in that it requires panelists to self-identify by, for instance, entering an identifier corresponding to their name, or it may be passive in that electronics (e.g., video cameras) may be used to identify and/or count persons in the audience. See U.S. Pat. No. 7,609,853, which is hereby incorporated by reference herein in its entirety for an example people metering solution.

A panelist home may present unique monitoring challenges to the media identifying meters. For example, a panelist home often includes multiple media presentation devices, each configured to present media to specific viewing and/or listening areas located within the home. Known media identifying meters that are located in one of the viewing and/or listening areas are typically configured to detect any media being presented in the viewing and/or listening area and to credit the media as having been presented. Thus, known media identifying meters operate on the premise that any media detected by the media identifying meter is media that was presented in that particular viewing and/or listening area. However, in some cases, a media identifying meter may detect media that is emitted by a media presentation device that is not located within the viewing or listening proximity of a panelist in the room with the media identifying meter thereby causing the detected media to be improperly credited to the panelist currently associated with the monitored area (via, for example, a people meter). The ability of the media identifying meter to detect media being presented outside of the viewing and/or listening proximity of the panelist is referred to as "spillover" because the media being presented outside of the viewing and/or listening proximity of the panelist is "spilling over" into the area occupied by the media identifying meter and may not actually fall within the attention of the panelist. Spillover may occur, for example, when a television in a particular room is powered off, but a media identifying meter associated with that television detects media being presented on a media presentation device in a different room of the panelist home or of an adjacent home (e.g., a neighbor's condominium or apartment). In such an example, the media identifying meter improperly credits the media as being presented on the media presentation device it monitors even though no such presentation occurred.

Another effect, referred to as "hijacking," occurs when a media identifying meter detects different media being presented at multiple media presentation devices at the same time. For example, a media identifying meter in a kitchen may detect a particular media program being presented on a media presentation device in the kitchen, but the media identifying meter may also detect a different media program that is being presented on a different media presentation device in a living room. In such an example, the media presented by the media presentation device in the living room may, in some cases, have signals that overpower or "hijack" the signals associated with the media being presented by the media presentation device in the kitchen. As a result, the media identifying meter in the kitchen may inaccurately credit the media being presented in the living room and fail to credit the media being presented in the kitchen. In some examples, other difficulties such as varying volume levels, varying audio/video content type (e.g., sparse, medium, rich, etc.), varying household transmission characteristics due to open/closed doors, movement and/or placement of furniture, acoustic characteristics of room layouts, wall construction, floor coverings, ceiling heights, etc. may exacerbate these issues and, thus, lead to inaccurate media presentation detection by media identifying meters.

Example methods and systems disclosed herein may be used to manage audio spillover and/or other sources of media monitoring inaccuracies in the course of presentations of media to more accurately assess the exposure of panelists to that media. Example methods and systems may be used to prevent audio spillover from adversely affecting results of media monitoring. Some example methods and systems analyze media monitoring data to determine if audio spillover has occurred. In some such examples, if audio spillover has not occurred, the media is credited as actual media exposure (e.g., a panelist has been exposed to the media). If audio spillover has occurred, the media is not credited as an actual media exposure.

Example methods and systems disclosed herein detect signal spillover by analyzing audio codes and/or signatures associated with media presentations. Media identifying meters monitoring media presentations from proximate (e.g., in the same room) media presentation devices generate media monitoring data that is used to identify the media presentations. In some examples, the media identifying meters timestamp the media monitoring data to indicate when the media monitoring data was collected (e.g., when a code was collected and/or when a signature was generated to identify media presentations).

In some examples, codes and/or signatures collected by a first media identifying meter are compared to codes and/or signatures collected by a second media identifying meter to determine if the first media identifying meter and the second media identifying meter collected the same code or the same signature (e.g., identify the same media presentation). In some such examples, if the first media identifying meter and the second media identifying meter did not collect the same code or the same signature, it is determined that spillover has not occurred and the media presentations identified by the codes and/or the signatures are credited with actual media exposure events.

If the first media identifying meter and the second media identifying meter collected the same code or the same signature, it is determined that spillover has occurred. In some such examples, when it is determined that spillover has occurred (e.g., that two media identifying meters have reported the same media presentation, but the media presentation is to be associated with one media identifying meter), it is determined whether to credit the media presentation associated with the first media identifying meter or the media presentation associated with the second media identifying meter with an actual media exposure event.

In some examples, to determine which media presentation to credit (e.g., which media to associate with which particular media identifying meter), a first timestamp of the code and/or signature associated with the first media identifying meter is compared to a second timestamp of the same code and/or signature associated with the second media identifying meter to determine which code and/or signature was collected and/or generated first. For example, a first media identifying meter may receive an audio signal from a proximate (e.g., in the same room) media presentation device and collect a code from that audio signal at a particular time. In such an example, a second media identifying meter in an adjacent room may receive the same audio signal from the same media presentation device, but may collect the same code from that audio signal at a later time than the first media identifying meter. The second media identifying meter may collect the code from the audio signal at a later time when the audio has traveled a larger distance than expected, the audio has been transmitted through different rooms (e.g., the signal has bounced off of walls, traveled through a wall, a ceiling, or a floor, etc.), etc.

If the first timestamp of the code and/or signature is earlier than the second timestamp of the same code and/or signature, the media associated with the code and/or signature of the first timestamp is credited with an actual media exposure event and the media associated with the code and/or signature of the second timestamp is not credited with an actual media exposure event. In other words, the media monitoring data collected by the first media identifying meter (e.g., the meter that collected the code at the earlier time) is credited and the media monitoring data collected by the second media identifying meter (e.g., the meter that collected the code at a later time) is not credited and/or is discarded. If the second timestamp of the code and/or signature is earlier than the first timestamp of the same code and/or signature, the media associated with the code and/or signature of the second timestamp is credited with an actual media exposure event and the media associated with the code and/or signature of the first timestamp is not credited with an actual media exposure event. In other words, the media monitoring data collected by the second media identifying meter is credited and the media monitoring data collected by the first media identifying meter is not credited and/or is discarded. If the first and second timestamps are identical or within a threshold time of each other, it is assumed that the media is presented on both the first and second media presentation devices and exposure credits are recorded by both media identifying meters.

An example method disclosed herein includes determining if first media monitoring data provided from a first meter identifies a same media as second media monitoring data provided from a second meter. If the first media monitoring data identifies the same media as the second media monitoring data, the example method includes detecting if spillover occurred by determining if an absolute value of a difference between a first timestamp associated with the first media monitoring data and a second timestamp associated with the second media monitoring data is less than a threshold. If spillover occurred, the example method includes determining which of the first media monitoring data or the second media monitoring data to credit as a media exposure.

An example spillover manager disclosed herein includes a code and/or signature comparator to determine if first media monitoring data provided from a first meter is equivalent to second media monitoring data provided from a second meter. If the first media monitoring data is not equivalent to the second media monitoring data, the example code and/or signature comparator is to determine that spillover did not occurred. The example spillover manager includes a timestamp comparator to determine whether spillover occurred by determining if an absolute value of a difference between a first timestamp associated with the first media monitoring data and a second timestamp associated with the second media monitoring data is less than a threshold and, if so, determining which of the first media monitoring data or the second media monitoring data to credit as a media exposure.

An example tangible computer readable storage medium disclosed herein comprises instructions that, when executed, cause a computing device to at least determine if first media monitoring data provided from a first meter identifies a same media as second media monitoring data provided from a second meter. If the first media monitoring data identifies the same media as the second media monitoring data, the example instructions cause the computing device to detect if spillover occurred by determining if an absolute value of a difference between a first timestamp associated with the first media monitoring data and a second timestamp associated with the second media monitoring data is less than a threshold. If spillover occurred, the example instructions cause the computing device to determine which of the first media monitoring data or the second media monitoring data to credit as a media exposure.

FIG. 1 illustrates an example media monitoring system 100 in an example environment of use. The example of FIG. 1 includes an example spillover manager 102 implemented in accordance with the teachings of this disclosure to manage spillover to reduce (e.g., prevent) media monitoring inaccuracies in the media monitoring system 100. In the illustrated example, a first media identifying meter 106 monitors media presented by a first media presentation device 108 in a first room 110 and a second media identifying meter 112 monitors media presented on a second media presentation device 114 in a second room 116. Either or both of the first and second media presentation devices 108, 114 may be, for example, a television, a radio, a computer, a stereo system, a DVD player, a game console, etc. Media may include, for example, any form of content, television programming, radio programming, movies, songs, any form of advertisements, Internet information such as websites and/or streaming media, and/or any other video information, audio information, still image information, and/or computer information to which a panelist (e.g., an example panelist 118) may be exposed. While two rooms 110, 116, two media presentation devices 108, 114, and two media identifying meters 106, 112 are shown in the example of FIG. 1, any number and/or type(s) of rooms, any number and/or type(s) of media presentation devices, and/or any number and/or type(s) of meters (including, for example, people meters) in any configuration and/or spatial relationship may be implemented in the example system 100.

In the illustrated example, to respectively monitor media presented on the first and second media presentation devices 108, 114, the first and second media identifying meters 106, 112 process media signals (or portions thereof such as audio portions of the media signals) respectively output by the first and second media presentation devices 108, 114 to extract codes and/or metadata, and/or to generate signatures for use in identifying the media and/or a station (e.g., a broadcaster) originating the media. The first media identifying meter 106 of the illustrated example is intended to monitor the first media presentation device 108 and to not monitor the second media presentation device 114. The second media identifying meter 112 is intended to monitor the second media presentation device 114 and to not monitor the first media presentation device 108.

Identification codes, such as watermarks, ancillary codes, etc. may be embedded within or otherwise transmitted with media signals. Identification codes are data that are inserted into media (e.g., audio or video) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of one or more characteristic(s) of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety. Codes, metadata, signatures, channel identifiers (e.g., tuned channel numbers), etc. collected and/or generated by the first or second media identifying meters 106, 112 for use in identifying media and/or a station transmitting media may be referred to generally as "media monitoring data."

In the illustrated example, the first and second media identifying meters 106, 112 timestamp their respective media monitoring data to indicate the time at which the codes and/or signatures were collected and/or generated at the respective meters. In the illustrated example, media monitoring data (e.g., including timestamps) collected by the first media identifying meter 106 and/or the second media identifying meter 112 is transferred to a home processing system 104 for further processing. The first and second media identifying meters 106, 112 may be communicatively coupled with the home processing system 104 via wireless and/or hardwired communications and may periodically and/or aperiodically communicate collected media monitoring information to the home processing system 104. People meters 128, 130 may likewise be communicatively coupled with the home processing system 104 to periodically and/or aperiodically forward people identification data to the home processing system 104.

In the illustrated example, the home processing system 104 is communicatively coupled to a remotely located central data collection facility 120 via a network 122. The example home processing system 104 of FIG. 1 transfers collected media monitoring data to the central facility 120 for further processing. The central facility 120 of the illustrated example collects and/or stores, for example, media monitoring data that is collected by multiple media monitoring devices such as, for example, the media identifying meters 106, 112, and/or demographic information that is collected by people meters, located at multiple panelist locations. The central facility 120 may be, for example, a facility associated with an audience measurement entity such as The Nielsen Company (US), LLC or any affiliate of The Nielsen Company (US), LLC. The central facility 120 of the illustrated example includes a server 124 and a database 126 that may be implemented using any suitable processor, memory and/or data storage apparatus such as that shown in FIG. 7. In some examples, the home processing system 104 is located in the central facility 120.

The network 122 of the illustrated example is used to communicate information and/or data between the example home processing system 104 and the central facility 120. The network 122 may be implemented using any type(s) of public and/or private network(s) such as, but not limited to, the Internet, a telephone network, a cellular network, a local area network ("LAN"), a cable network, and/or a wireless network. To enable communication via the network 122, the home processing system 104 of the illustrated example includes a communication interface that enables connection to an Ethernet, a digital subscriber line ("DSL"), a telephone line, a coaxial cable, and/or any wireless connection, etc.

Some known methods for measuring media exposure or presentation track or log media presentations to which a panelist is exposed and award a media exposure credit to a media presentation whenever the panelist is in the vicinity of that media presentation. However, some such methods may produce inconsistent or inaccurate monitoring results due to spillover that occurs. For example, within the example environment illustrated in FIG. 1, spillover may occur when the first media presentation device 108 is powered off (e.g., is not presenting media), but the first media identifying meter 106 associated with the first media presentation device 108 detects media being presented by the second media presentation device 114. In such an example, the first media identifying meter 106 will incorrectly credit the media presented at the second media presentation device 114 as being presented to the panelist 118. Recording media data that has spilled over from another space (e.g., the room 116) may result in an inaccurate representation of the media presented to the panelist 118. In some such examples, the panelist 118 may not even know or be aware of the media, but the electronics of the media identifying meter 106 may still be sensitive enough to detect a code in the media presented by the second media presentation device 114.

The spillover manager 102 of the illustrated example is used to manage spillover to reduce (e.g., prevent) media monitoring inaccuracies in the example system 100 of FIG. 1. The example spillover manager 102 of FIG. 1 receives media monitoring data from the first example media identifying meter 106 and/or the second example media identifying meter 112 and analyzes the media monitoring data to determine if spillover has occurred. In the illustrated example, if the example spillover manager 102 detects spillover associated with the first media identifying meter 106 and/or the second media identifying meter 112, the media identified in the media monitoring data is not credited as actual media exposure for the meter/monitored media presentation device that experienced the spillover and the media monitoring data associated with the uncredited media is discarded and/or marked (e.g., labeled) as invalid. In the illustrated example, if the example spillover manager 102 does not detect spillover associated with the first media identifying meter 106 and/or the second media identifying meter 112, the media identified in the media monitoring data is credited as actual media exposure(s). In the illustrated example, the spillover manager 102 sends media monitoring data associated with credited media to the example central facility 120. In some examples, the spillover manager 102 labels portion(s) of the media monitoring data as either associated with credited or uncredited media and sends the identified media monitoring data to the example central facility 120.

In the illustrated example, the spillover manager 102 detects spillover by analyzing media monitoring data provided to the example spillover manager 102 by the media identifying meters 106, 112. In some examples, the media monitoring data includes codes and/or signatures associated with media presentations (e.g., codes and/or signatures used to identify media presentations) and timestamps identify times at which the respective codes and/or signatures were collected/generated (e.g., to indicate when the media monitoring data was collected).

In the illustrated example, to determine if spillover occurred, the spillover manager 102 compares codes and/or signatures collected by the first media identifying meter 106 to respective codes and/or signatures collected by the second media identifying meter 112. The spillover manager 102 of the illustrated example determines if the first media identifying meter 106 and the second media identifying meter 112 collected the same code and/or generated the same signature (e.g., identified the same media). If the first media identifying meter 106 and the second media identifying meter 112 did not collect the same code and/or generate the same signature, the spillover manager 102 of the illustrated example determines that spillover did not occur for the corresponding media identification events (e.g., the media identification events identified by the codes and/or signatures being analyzed). Thus, the person(s) (e.g., the panelist 118) identified as present by a first people meter 128 associated with the first media identifying meter 106/first media presentation device 108 and the person(s) identified as present by a second people meter 130 associated with the second media identifying meter 112/second media presentation device 114 are credited as having been exposed to the respective media identified by the respective codes and/or signatures.

If the first media identifying meter 106 and the second media identifying meter 112 collected the same code and/or generated the same signature, the spillover manager 102 of the illustrated example determines that spillover may have occurred for the corresponding media identification event (e.g., identified by the same code and/or signature). When the example spillover manager 102 determines that spillover may have occurred, the spillover manager 102 of the illustrated example calculates a difference between the timestamps of the identical codes and/or signatures and compares the difference to a threshold. In some examples, the threshold is a time less than the time it takes for an audio signal to travel between the presentation device potentially providing the media that may spillover and the media identifying meter 106, 112 which is not intended to monitor that presentation device. In some examples, the threshold is a time halfway between the time it takes for an audio signal to travel between the presentation device providing the media and the media identifying meter 106, 112 which is intended to monitor that presentation device and the time it takes for the audio signal to travel between the presentation device providing the media and the media identifying meter 106, 112 which is not intended to monitor that presentation device. If the difference is less than the threshold, the spillover manager 102 concludes spillover did not occur and the media is credited with two exposures, one at each media identifying meter 106, 112. If the difference is greater than the threshold, the spillover manager 102 determines whether to credit the media identified by the first media identifying meter 106 or to credit the media identified by the second media identifying meter 112 with an actual media exposure event.

To determine whether to credit the media identified by the first media identifying meter 106 or to credit the media identified by the second media identifying meter 112, the spillover manager 102 of the illustrated example compares the timestamps of the respective codes and/or signatures. In particular, the spillover manager 102 of the illustrated example compares a first timestamp of the code and/or signature associated with the first media identifying meter 106 to a second timestamp of the same code and/or signature associated with the second media identifying meter 112 to determine which code and/or signature was collected or generated first. If the first timestamp of the code and/or signature is earlier than the second timestamp of the same code and/or signature, the media identified by the code and/or signature with the first timestamp collected by the first media identifying meter 106 is credited with an actual media exposure event and the media identified by the code and/or signature associated with the second timestamp collected by the second media identifying meter 112 is not credited with an actual media exposure event. If the first timestamp of the code and/or signature is not earlier than (e.g., is later in time than) the second timestamp of the same code and/or signature, the media identified by the code and/or signature with the second timestamp collected by the second media identifying meter 112 is credited with an actual media exposure event and the media identified by the code and/or signature with the first timestamp collected by the first media identifying meter 106 is not credited with an actual media exposure event.

For example, the first media identifying meter 106 may receive an audio signal from the first media presentation device 108 and collect a code from that audio signal at a particular time X. The second media identifying meter 112 may receive the same audio signal from the first media presentation device 108, but may collect the same code from the audio signal at a later time Y. Time Y is later than time X (e.g., 20 milliseconds later). If the difference between time X and time Y is greater than a threshold T, the spillover manager 102 of the illustrated example assumes the audio signal spilled over to the second media identifying meter 112 from the first media presentation device 108. Accordingly, the person(s) (e.g., the panelist 118) identified as present by the first people meter 128 associated with the first media identifying meter 106 are credited as having been exposed to media identified by the code and the persons (e.g., the panelist 118) identified as present by the second people meter 130 associated with the second media identifying meter 112 are not credited as having been exposed to media identified by the code.

While the spillover manager 102 of the illustrated example is shown within the example home processing system 104, the spillover manager 102 may be implemented at the first media identifying meter 106, the second media identifying meter 112, and/or at the central facility 120.

Figure 2:
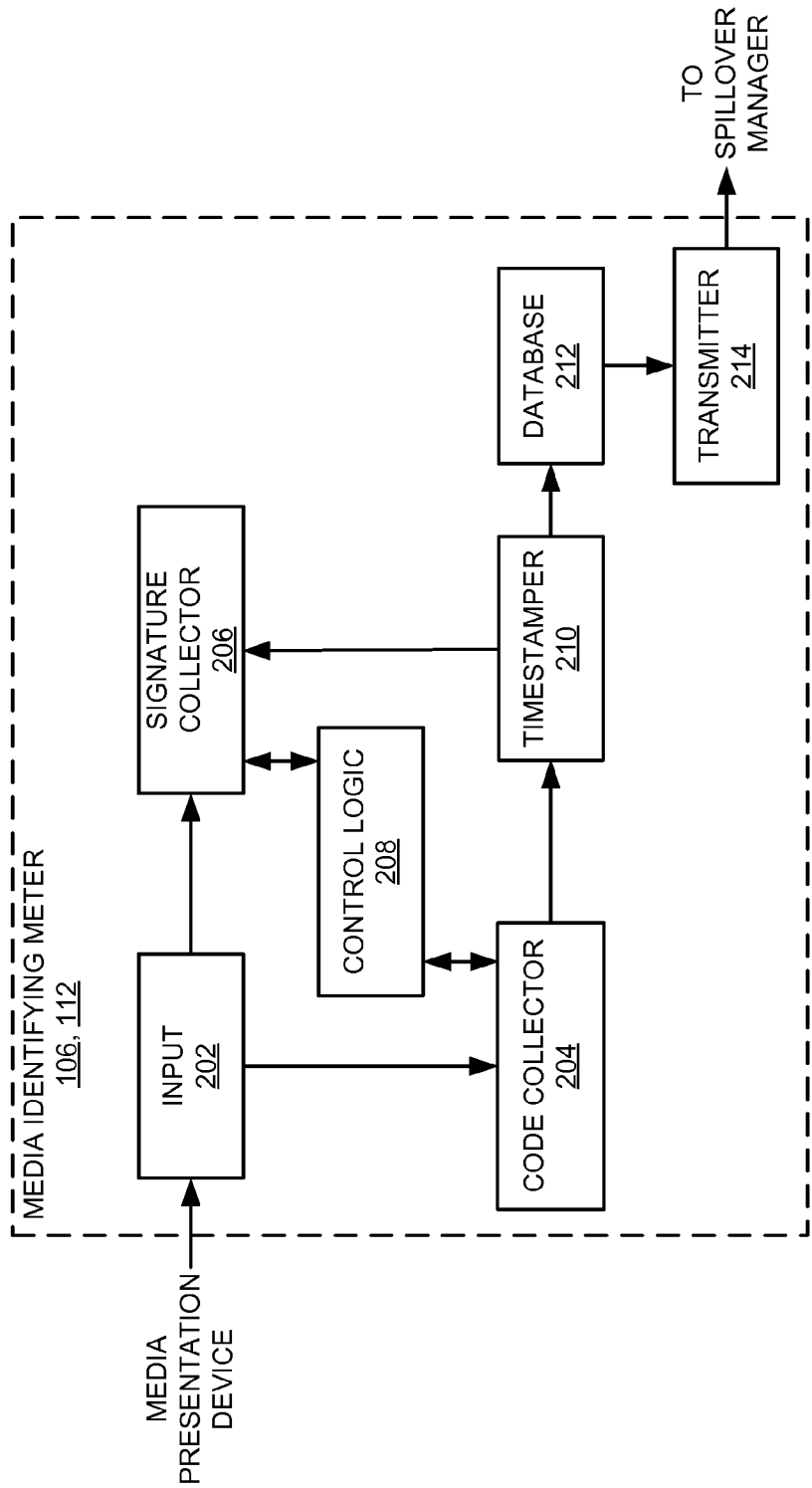
FIG. 2 illustrates an example implementation of an example media identifying meter of FIG. 1.

FIG. 2 is a block diagram of an example implementation of the first and/or second media identifying meters 106, 112 of FIG. 1. The media identifying meter 106, 112 of the illustrated example receives media signals (e.g., audio signals) from one or more media presentation devices (e.g., the first or second media presentation device 108, 114 of FIG. 1). In the illustrated example, the media identifying meter 106, 112 is used to collect media monitoring data (e.g., to extract and/or analyze codes and/or signatures from media signals output by a corresponding media presentation device 108, 114). Thus, the media identifying meter 106, 112 of the illustrated example is used to collect, aggregate, locally process, and/or transfer media monitoring data to the spillover manager 102 of FIG. 1. The media identifying meter 106, 112 of the illustrated example includes an example input 202, an example code collector 204, an example signature generator 206, example control logic 208, an example timestamper 210, an example database 212, and an example transmitter 214.

In the illustrated example, the input 202 is a microphone exposed to ambient sound and serves to collect audio signals output by monitored media presentation devices (e.g., the media presentation device 108). To collect media monitoring data associated with the audio signals, the input 202 of the illustrated example passes a received audio signal to the code collector 204 and/or the signature generator 206. The code collector 204 of the illustrated example extracts codes and/or the signature generator 206 generates signatures from the signal to identify broadcasters, channels, stations, and/or programs. The control logic 208 of the illustrated example is used to control the code collector 204 and/or the signature generator 206 to cause collection of a code, a signature, or both a code and a signature.

The identified codes and/or signatures (e.g., the media monitoring data) are timestamped at the timestamper 210 of the illustrated example. The example timestamper 210 may obtain times to be used as the timestamps using, for example, global positioning system (GPS) technology, cell modem technology that communicates with a cellular tower with a time base, etc. In some examples, a home processing system (e.g., the home processing system 104 of FIG. 1) obtains times using GPS technology, cell modem technology, etc. and sends the times to the example timestamper 210 (e.g., using wireless and/or wired communication systems) for use in timestamping identified codes and/or signatures.

To provide consistent timestamps across the media identifying meters 106, 112 (e.g., so that the media identifying meters 106, 112 timestamp codes and/or signatures at consistent times (e.g., the difference between the timestamps when identical media is tuned by the first and second media presentation devices will be less than a threshold T)), the example timestamper 210 timestamps the codes and/or signatures at a peak of a waveform of the audio signal containing the collected code, a peak of a waveform of the audio signal representative of a transient event, etc. In some examples, the threshold T corresponds to the later of the time it takes an audio signal to travel from the first media presentation device to the second meter (which is not intended to monitor the first media presentation device) or the second media presentation device to the first meter (which is not intended to monitor the second media presentation device). In some examples, the threshold T corresponds to a time halfway between the time it takes an audio signal to travel from the first media presentation device to the first meter and the time it takes the audio signal to travel from the first media presentation device to the second meter. Using, for example, peaks of waveforms of the audio signal as indicators for when to timestamp collected codes and/or signatures provides consistency across media identifying meters 106, 112 so that timestamps of the media identifying meters 106, 112 may be compared to the threshold T to identify potential spillover.

The timestamped codes and/or signatures are stored in the example database 212 and are transmitted by the example transmitter 214 to the spillover manager 102 at the home processing system 104. Although the example of FIG. 2 collects codes and/or signatures from audio signals, codes and/or signatures can additionally or alternatively be collected from other portion(s) of the signal (e.g., from the video portion).

While an example manner of implementing the media identifying meter 106, 112 of FIG. 1 is illustrated in FIG. 2, one or more of the elements, processes and/or devices illustrated in FIG. 2 may be combined, divided, re-arranged, omitted, eliminated and/or implemented in any other way. Further, the example input 202, the example code collector 204, the example signature collector 206, the example control logic 208, the example timestamper 210, the example database 212, the example transmitter 214, and/or, more generally, the example media identifying meter 106, 112 of FIG. 1 may be implemented by hardware, software, firmware and/or any combination of hardware, software and/or firmware. Thus, for example, any of the example input 202, the example code collector 204, the example signature collector 206, the example control logic 208, the example timestamper 210, the example database 212, the example transmitter 214, and/or, more generally, the example media identifying meter 106, 112 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example input 202, the example code collector 204, the example signature collector 206, the example control logic 208, the example timestamper 210, the example database 212, the example transmitter 214, and/or the example media identifying meter 106, 112 are hereby expressly defined to include a tangible computer readable storage device or storage disc such as a memory, DVD, CD, Blu-ray, etc. storing the software and/or firmware. Further still, the example media identifying meter 106, 112 of FIG. 1 may include one or more elements, processes and/or devices in addition to, or instead of, those illustrated in FIG. 2, and/or may include more than one of any or all of the illustrated elements, processes and devices.

Figure 3:
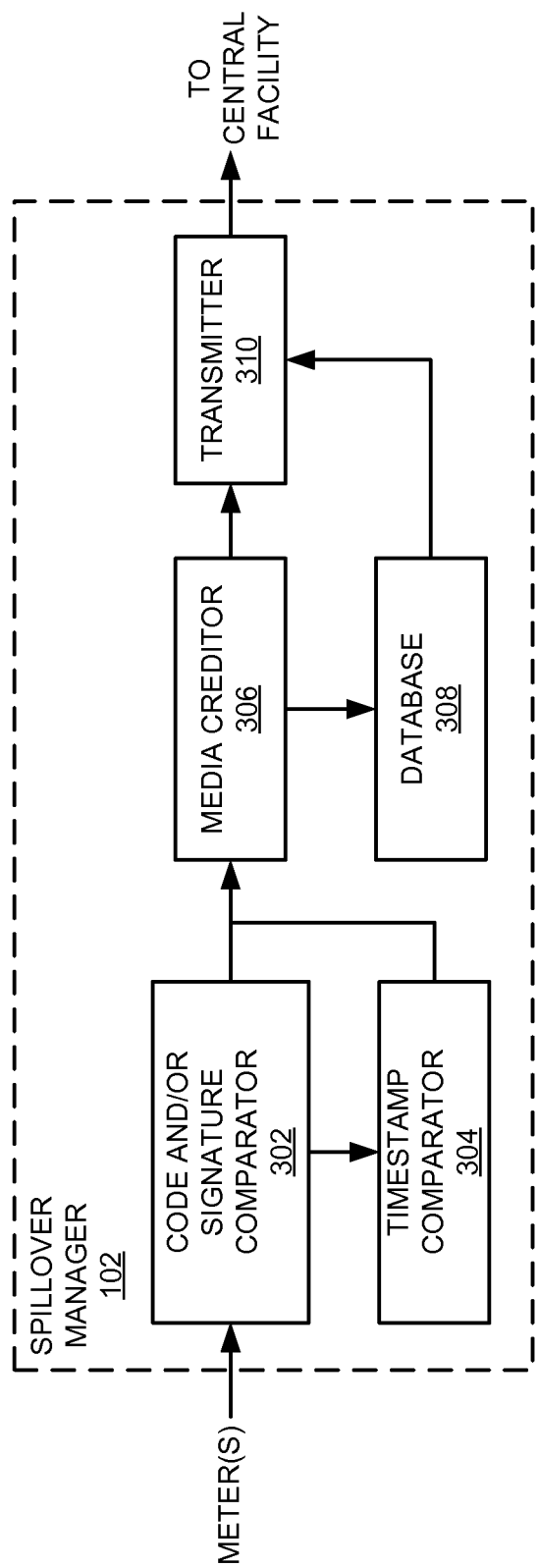
FIG. 3 illustrates an example implementation of the example spillover manager of FIG. 1.

FIG. 3 is a block diagram of an example implementation of the spillover manager 102 of FIG. 1. The spillover manager 102 of the illustrated example receives media monitoring data from two or more media identifying meter(s) (e.g., the media identifying meters 106, 112 of FIG. 1). In the illustrated example, the spillover manager 102 uses the media monitoring data to determine whether spillover occurred (e.g., in the example system 100 of FIG. 1) and whether identified media is to be credited with actual exposure to a panelist at corresponding meters. The spillover manager 102 of the illustrated example transfers credited media monitoring data (e.g., media monitoring data associated with credited media programs) to the central facility 120 of FIG. 1. The spillover manager 102 of the illustrated example includes an example code and/or signature comparator 302, an example timestamp comparator 304, an example media creditor 306, an example database 308, and an example transmitter 310.

The code and/or signature comparator 302 of the illustrated example receives media monitoring data from the media identifying meter(s) (e.g., the first and second media identifying meters 106, 112 of FIG. 1). The media monitoring data includes codes and/or signatures associated with media presentations (e.g., codes and/or signatures used to identify media presentations). The codes and/or signatures are associated with timestamps (e.g., to indicate when the media monitoring data was collected).

The code and/or signature comparator 302 of the illustrated example compares codes and/or signatures collected by a first media identifying meter (e.g., the first media identifying meter 106) to codes and/or signatures collected by a second media identifying meter (e.g., the second media identifying meter 112). The code and/or signature comparator 302 of the illustrated example determines if the first media identifying meter 106 and the second media identifying meter 112 collected the same code and/or generated the same signature (e.g., identified the same media). If the first media identifying meter 106 and the second media identifying meter 112 did not collect the same code and/or generate the same signature, the code and/or signature comparator 302 of the illustrated example determines that spillover did not occur for the corresponding media identification events (e.g., the media identification events identified by the codes and/or signatures being analyzed). In such circumstances, the code and/or signature comparator 302 of the illustrated example instructs the example media creditor 306 to credit the media associated with all of the media identification events under analysis with actual media exposures. For example, both the media identified by the first media identifying meter 106 and the media identified by the second media identifying meter 112 are credited with actual media exposures.

If the code and/or signature comparator 302 of the illustrated example determines that the first media identifying meter 106 and the second media identifying meter 112 collected the same code and/or generated the same signature, the code and/or signature comparator 302 determines that spillover may have occurred for the corresponding media identification event (e.g., identified by the same code and/or signature). When the example code and/or signature comparator 302 determines that spillover may have occurred, the timestamp comparator 304 of the illustrated example determines whether the absolute values of the difference in times between the first (X) and second (Y) timestamps is less than a threshold (T). This determination can be represented by the following equation:

$$|X-Y|<T$$

where T is a time less than the smaller of: (a) the time it takes an audio signal to travel between the first media identifying meter 106 and the second media presentation device 114 and (b) the time it takes the audio signal to travel between the second media identifying meter 112 and the first media presentation device 108. In some examples, T is a time approximately halfway between the time it takes an audio signal to travel between the first media identifying meter 106 and the first media presentation device 108 and the time it takes the audio signal to travel between the first media identifying meter 106 and the second media presentation device 114. In some examples, T is a time halfway between the time it takes an audio signal to travel between the second media identifying meter 112 and the second media presentation device 114 and the time it takes the audio signal to travel between the second media identifying meter 112 and the first media presentation device 108. If the absolute value of the time difference is less than the threshold (i.e., the above equation is true), then any difference between the timestamps is due to factors such as drift in the clocks of the timestampers, differences in the performance of the media identifying meters 106, 112, etc., and spillover did not actually occur. Instead, the same media are presented at both the first media presentation device 108 and the second media presentation device 114. Accordingly, the output of the timestamp comparator 304 indicates the media should be credited with an exposure at both meters 106, 112.

If the above equation is false (i.e., the absolute value of the time difference between the timestamps in question is greater than or equal to the lesser of the time it takes for an audio signal to travel from the first media identifying meter 106 to the second media presentation device 114 or the time it takes the audio signal to travel from the first media presentation device 108 to the second media identifying meter 112, then the timestamp comparator 304 determines spillover did, in fact, occur and determines whether to credit the media identified by the first media identifying meter 106 or to credit the media identified by the second media identifying meter 112 with an actual media exposure event.

To determine whether to credit (1) the media identified by the first media identifying meter 106 or (2) the media identified by the second media identifying meter 112 with the actual media exposure event, the timestamp comparator 304 of the illustrated example compares timestamps of the codes and/or signatures found to be the same by the example code and/or signature comparator 302. The timestamp comparator 304 of the illustrated example compares a first timestamp of the code and/or signature associated with the first media identifying meter 106 to a second timestamp of the same code and/or signature associated with the second media identifying meter 112 to determine which code and/or signature was collected or generated first (i.e., earlier in time).

If the first timestamp of the code and/or signature is earlier than the second timestamp of the same code and/or signature, the timestamp comparator 304 of the illustrated example determines that the media identified by the code and/or signature with the first timestamp collected by the first media identifying meter 106 is to be credited with an actual media exposure event. The timestamp comparator 304 of the illustrated example also determines that the media identified by the code and/or signature with the second timestamp collected by the second media identifying meter 112 is not to be credited with an actual media exposure event. The timestamp comparator 304 of the illustrated example instructs the example media creditor 306 to credit the media associated with the first media identifying meter 106 with an actual media exposure event and to not credit the media associated with the second media identifying meter 112 with an actual media exposure event.

If the first timestamp of the code and/or signature is not earlier than the second timestamp of the same code and/or signature, the timestamp comparator 304 of the illustrated example determines that the media identified by the code and/or signature with the second timestamp collected by the second media identifying meter 112 is to be credited with an actual media exposure event. The timestamp comparator 304 of the illustrated example also determines that the media identified by the code and/or signature with the first timestamp collected by the first media identifying meter 106 is not to be credited with an actual media exposure event. The timestamp comparator 304 of the illustrated example instructs the example media creditor 306 to credit the media associated with the second media identifying meter 112 with an actual media exposure event and to not credit the media associated with the first media identifying meter 106 with an actual media exposure event.

The media creditor 306 of the illustrated example credits/does not credit media as actual media exposure based on the outputs of the example code and/or signature comparator 302 and/or the example timestamp comparator 304. If the example code and/or signature comparator 302 or the timestamp comparator 304 determine that spillover did not occur, the media creditor 306 of the illustrated example marks (e.g., labels) the media monitoring data associated with the media from both the first media identifying meter 106 and the second media identifying meter 112 as credited. If the example code and/or signature comparator 302 and the timestamp comparator 304 determine that spillover did occur, and the example timestamp comparator 304 determines that media associated with the first media identifying meter 106 is to be credited, the media creditor 306 of the illustrated example marks the media monitoring data associated with the media from the first media identifying meter 106 as credited and discards the media monitoring data associated with the media from the second media identifying meter 112. If the example code and/or signature comparator 302 and the timestamp comparator 304 determine that spillover did occur, and the example timestamp comparator 304 determines that media associated with the second media identifying meter 112 is to be credited, the media creditor 306 of the illustrated example marks the media monitoring data associated with the media from the second media identifying meter 112 as credited and discards the media monitoring data associated with the media from the first media identifying meter 106. In some examples, rather than discarding the media monitoring data associated with the media that is not credited, the example media creditor 306 marks the media monitoring data associated with the media as uncredited.

The database 308 of the illustrated example stores the credited media monitoring data. The transmitter 310 of the illustrated example transmits the credited media monitoring data to a central facility (e.g., the central facility 120 of FIG. 1) for further processing. In some examples, where the example media creditor 306 does not discard the uncredited media monitoring data, the example database stores the credited media monitoring data and the uncredited media monitoring data and the example transmitter 310 transmits the credited media monitoring data and the uncredited media monitoring data to the central facility 120 for further processing.

While an example manner of implementing the spillover manager 102 of FIG. 1 is illustrated in FIG. 3, one or more of the elements, processes and/or devices illustrated in FIG. 3 may be combined, divided, re-arranged, omitted, eliminated and/or implemented in any other way. Further, the example code and/or signature comparator 302, an example timestamp comparator 304, the example media creditor 306, the example database 308, the example transmitter 310, and/or, more generally, the example spillover manager 102 of FIG. 1 may be implemented by hardware, software, firmware and/or any combination of hardware, software and/or firmware. Thus, for example, any of the example code and/or signature comparator 302, an example timestamp comparator 304, the example media creditor 306, the example database 308, the example transmitter 310, and/or, more generally, the example spillover manager 102 could be implemented by one or more circuit(s), programmable processor(s), application specific integrated circuit(s) (ASIC(s)), programmable logic device (s) (PLD(s)) and/or field programmable logic device(s) (FPLD(s)), etc. When reading any of the apparatus or system claims of this patent to cover a purely software and/or firmware implementation, at least one of the example code and/or signature comparator 302, the example timestamp comparator 304, the example media creditor 306, the example database 308, the example transmitter 310, and/or the example spillover manager 102 are hereby expressly defined to include a tangible computer readable storage device or storage disc such as a memory, DVD, CD, Blu-ray, etc. storing the software and/or firmware. Further still, the example spillover manager 102 of FIG. 1 may include one or more elements, processes and/or devices in addition to, or instead of, those illustrated in FIG. 3, and/or may include more than one of any or all of the illustrated elements, processes and devices.

Figure 4:
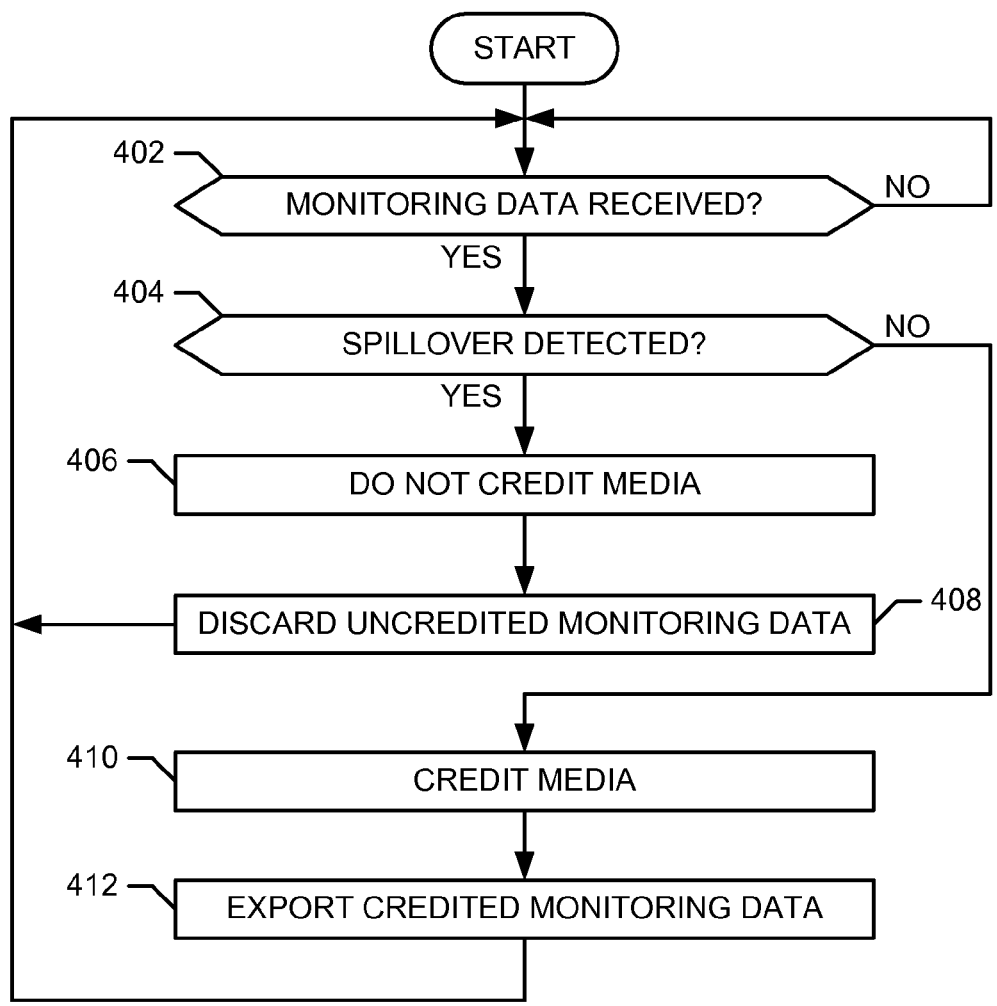
FIG. 4 is a flow diagram representative of example machine readable instructions that may be executed to implement the example spillover manager of FIGS. 1 and/or 3.
Figure 5:
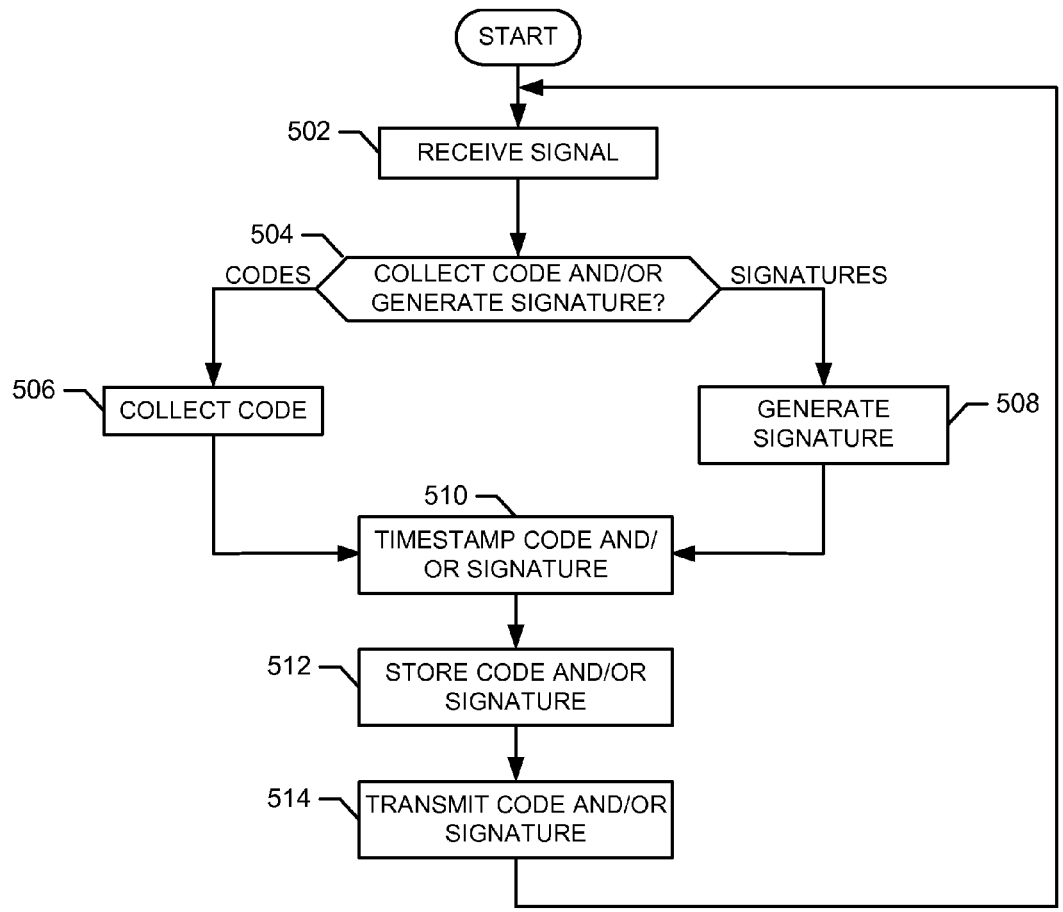
FIG. 5 is a flow diagram representative of example machine readable instructions that may be executed to implement the example media identifying meter of FIGS. 1 and/or 2.
Figure 6:
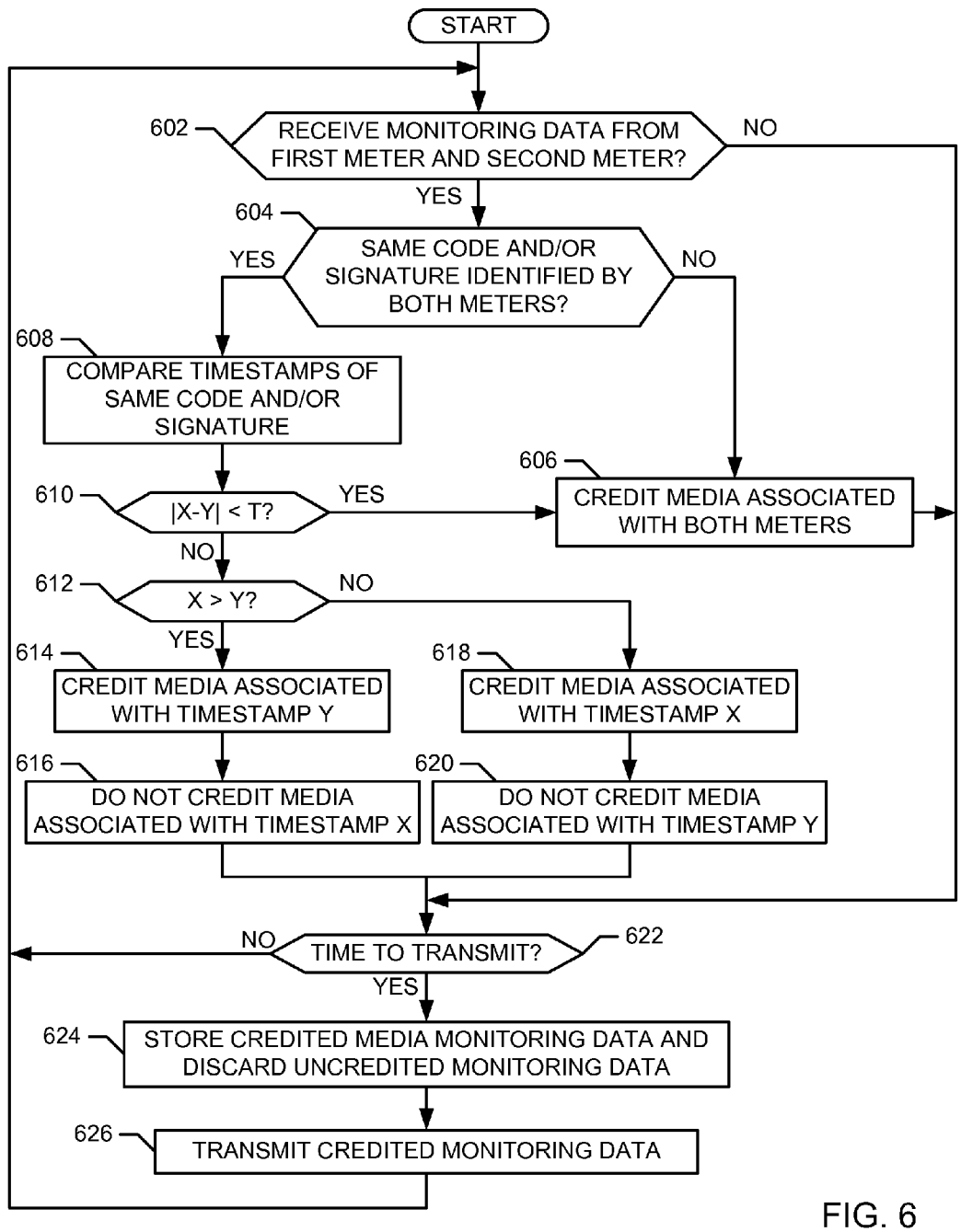
FIG. 6 is another flow diagram representative of example machine readable instructions that may be executed to implement the example spillover manager of FIGS. 1 and/or 3.

Flowcharts representative of example machine readable instructions for implementing the media identifying meter 106, 112 of FIGS. 1 and 2 and the spillover manager 102 of FIGS. 1 and 3 are shown in FIGS. 4, 5, and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4, 5, and 6, many other methods of implementing the example media identifying meter 106, 112 and the example spillover manager 102 may alternatively be used. For example, the order of execution of the blocks may be changed, and/or some of the blocks described may be changed, eliminated, or combined.

As mentioned above, the example processes of FIGS. 4, 5, and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4, 5, and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 4 is a flow diagram representative of example machine readable instructions that may be executed to implement the example spillover manager 102 of FIG. 1 to manage audio spillover in the example system 100 of FIG. 1. The spillover manager 102 of the illustrated example is used to manage spillover to reduce (e.g., prevent) media monitoring inaccuracies in the system 100.

The example spillover manager 102 determines if media monitoring data has been received (block 402). The example spillover manager 102 is to receive media monitoring data from one or more media identifying meter(s) (e.g., the first and/or second media identifying meters 106, 112 of FIG. 1). The media monitoring data is representative of media that has been presented on one or more media presentation device(s) (e.g., the first and/or second media presentation devices 108, 114 of FIG. 1). Control remains at block 402 until media monitoring data is received by the example spillover manager 102).

The example spillover manager 102 of the illustrated example analyzes the media monitoring data to determine if spillover has occurred (block 404). An example method to determine if spillover has occurred is described below with reference to FIG. 6. If the example spillover manager 102 detects spillover associated with the first and/or second media identifying meters 106, 112 based on the media monitoring data, the media identified in the media monitoring data is not credited as an actual media exposure (block 406) and the media monitoring data associated with the uncredited media is discarded (block 408). Control then returns to block 402. In some examples, rather than discarding the uncredited media monitoring data, the example spillover manager 102 identifies the media monitoring data as uncredited media and exports the uncredited media monitoring data to a central facility (e.g., the example central facility 120).

If the example spillover manager 102 of the illustrated example does not detect spillover associated with the first and/or the second media identifying meter 106, 112, the media identified in the media monitoring data is credited as an actual media exposure (block 410). The example spillover manager 102 of the illustrated example exports media monitoring data associated with credited media to the example central facility 120 (block 412). Control then returns to block 402 when the instructions are complete.

FIG. 5 is a flow diagram representative of example machine readable instructions that may be executed to implement the example media identifying meter 106, 112 of FIG. 1 to collect media monitoring data. In the illustrated example, to collect media monitoring data, the media identifying meter 106, 112 extracts and/or analyzes codes and/or signatures from data and/or signals received from one or more media presentation devices (e.g., the first and/or the second media presentation devices 108, 114 of FIG. 1).

Initially, the example input 202 obtains a signal (e.g., an audio signal) from the one or more media presentation devices (e.g., the first and/or the second media presentation devices 108, 114) (block 502). The example control logic 208 determines whether to collect a code or generate a signature from the signal obtained at the input 202 (block 504). In the illustrated example, either a code is collected or a signature is generated from the signal. In other examples, both a code and a signature are collected and/or generated.

If a code is to be collected, the example code collector 204 collects a code from the signal obtained at the input 202 (block 506). The example code collector 204 passes the collected code(s) to the timestamper 210. If a signature is to be generated, the signature generator 206 generates a signature from the signal obtained at the input 202 (block 508). The example signature generator 206 passes the generated signature(s) to the timestamper 210.

The example timestamper 210 timestamps the collected codes and/or generated signatures (block 510). The example timestamper 210 passes the collected codes and/or generated signatures to the example database 212. The example database 212 stores the collected codes and/or generated signatures (block 512). The example transmitter 214 periodically and/or aperiodically transmits the collected codes and/or generated signatures to the spillover manager 102 of FIG. 1 (block 514). Control then returns to block 502. In some examples, the media identifying meter 106, 112 collects and timestamps the data, and periodically or aperiodically exports the timestamped data for analysis by the spillover manager 102 (which may be located at the panelist site or at the central facility). In such examples, blocks 504-508 and 512 are not performed in the media identifying meter 106, 112, and blocks 510 and 514 are modified to operate on the received signal (as opposed to on codes and/or signatures).

FIG. 6 is a flow diagram representative of example machine readable instructions that may be executed to implement the example spillover manager 102 of FIG. 3 to manage audio spillover in the example system 100 of FIG. 1 using media monitoring data. The spillover manager 102 of the illustrated example is used to manage spillover to reduce media monitoring inaccuracies in the system 100.

The example spillover manager 102 determines if media monitoring data has been received from two or more media identifying meter(s) (e.g., the first and/or second media identifying meters 106, 112 of FIG. 1) (block 602). If not, control advances to block 622. If so, the example spillover manager 102 uses the media monitoring data to determine whether spillover occurred (e.g., in the example system 100 of FIG. 1) and whether media is to be credited with an actual media exposure event.

The code and/or signature comparator 302 of the illustrated example compares codes and/or signatures collected by the first media identifying meter 106) to codes and/or signatures collected by the second media identifying meter 112. The code and/or signature comparator 302 of the illustrated example determines if the first media identifying meter 106 and the second media identifying meter 112 collected the same code and/or generated the same signature (e.g., identified the same media) (block 604).

If the first media identifying meter 106 and the second media identifying meter 112 did not collect the same code and/or generate the same signature (block 604), the code and/or signature comparator 302 of the illustrated example determines that spillover did not occur for the corresponding media identification events (e.g., the media identification events identified by the codes and/or signatures being analyzed) (block 604). When the code and/or signature comparator 302 determines that spillover did not occur (block 604), the code and/or signature comparator 302 of the illustrated example instructs the example media creditor 306 to credit the media associated with the media identification events with actual media exposures. The media creditor 306 of the illustrated example marks the media monitoring data associated with the media from both the first media identifying meter 106 and the second media identifying meter 112 as credited (block 606). Control then proceeds to block 622.

If the code and/or signature comparator 302 of the illustrated example determines that the first media identifying meter 106 and the second media identifying meter 112 collected the same code and/or generated the same signature (block 604), the code and/or signature comparator 302 determines that spillover occurred for the corresponding media identification event (e.g., identified by the same code and/or signature). When the example code and/or signature comparator 302 determines that spillover occurred (block 604), the timestamp comparator 304 of the illustrated example determines whether to credit the media identified by the first media identifying meter 106 or to credit the media identified by the second media identifying meter 112 with an actual media exposure event.

To determine whether to credit the media identified by the first media identifying meter 106 or to credit the media identified by the second media identifying meter 112, the timestamp comparator 304 of the illustrated example compares timestamps of the codes and/or signatures found to be the same by the example code and/or signature comparator 302 (block 608). The timestamp comparator 304 of the illustrated example compares a first timestamp X of the code and/or signature associated with the first media identifying meter 106 to a second timestamp Y of the same code and/or signature associated with the second media identifying meter 112 to determine which code and/or signature was collected or generated first (block 608).

The timestamp comparator 304 of the illustrated example determines if the absolute value of the difference between timestamp X and timestamp Y is less than a threshold (T) (block 610). In some examples, the threshold T is a time less than the smaller of: (a) time it takes an audio signal to travel between the first media identifying meter 106 and the second media presentation device 114 and (b) the time it takes the audio signal to travel between the second media identifying meter 112 and the first media presentation device 108. In some examples, the threshold T is a time approximately halfway between the time it takes an audio signal to travel between the first media identifying meter 106 and the first media presentation device 108 and the time it takes the audio signal to travel between the first media identifying meter 106 and the second media presentation device 114. In some examples, the threshold T is a time approximately halfway between the time it takes an audio signal to travel between the second media identifying meter 112 and the second media presentation device 114 and the time it takes the audio signal to travel between the second media identifying meter 112 and the first media presentation device 108. If the absolute value of the difference between the timestamp X and the timestamp Y is less than the threshold T (block 610), the timestamp comparator 304 of the illustrated example instructs the example media creditor 306 to credit the media associated with the media identification events with actual media exposures. The media creditor 306 of the illustrated example marks the media monitoring data associated with the media from both the first media identifying meter 106 and the second media identifying meter 112 as credited (block 606).

If the absolute value of the difference between the timestamp X and the timestamp Y is not less than the threshold T (block 610), the timestamp comparator 304 of the illustrated example determines if the timestamp X is greater than the timestamp Y (block 612). If the timestamp X is greater than the timestamp Y, the timestamp comparator 304 of the illustrated example instructs the example media creditor 306 to credit the media associated with the timestamp Y and the media creditor 306 marks the media monitoring data associated with the media for the timestamp Y as credited (block 614). The timestamp comparator 304 of the illustrated example instructs the example media creditor 306 not to credit the media associated with the timestamp X (block 616). Control then proceeds to block 622.

If the timestamp X is not greater than the timestamp Y (block 612), the timestamp comparator 304 of the illustrated example instructs the example media creditor 306 to credit the media associated with the timestamp X and the media creditor 306 marks the media monitoring data associated with the media for the timestamp X as credited (block 618). The timestamp comparator 304 of the illustrated example instructs the example media creditor 306 not to credit the media associated with the timestamp Y (block 620).

The media creditor 306 of the illustrated example determines if it is time to transmit the credited media to a central facility (e.g., the central facility 120 of FIG. 1) (block 622). If it is not time to transmit the credited media, control returns to block 602. If it is time to transmit the credited media, the media creditor 306 of the illustrated example stores the credited media monitoring data in the database 308 and discards the uncredited monitoring data (block 624) and the transmitter 310 of the illustrated example transmits the credited media monitoring data to the central facility 120 for further processing (block 626). In some examples, where the example media creditor 306 does not discard the uncredited media monitoring data, the example database 308 stores the credited media monitoring data and the uncredited media monitoring data (block 624) and the example transmitter 310 transmits the credited media monitoring data and the uncredited media monitoring data to the central facility 120 for further processing (block 626). Control then returns to block 602 when the instructions are complete.

The credited media monitoring data is combined with the people meter data using timestamps to align the two data sources to match demographics and audience size data to the credited media exposures.

Figure 7:
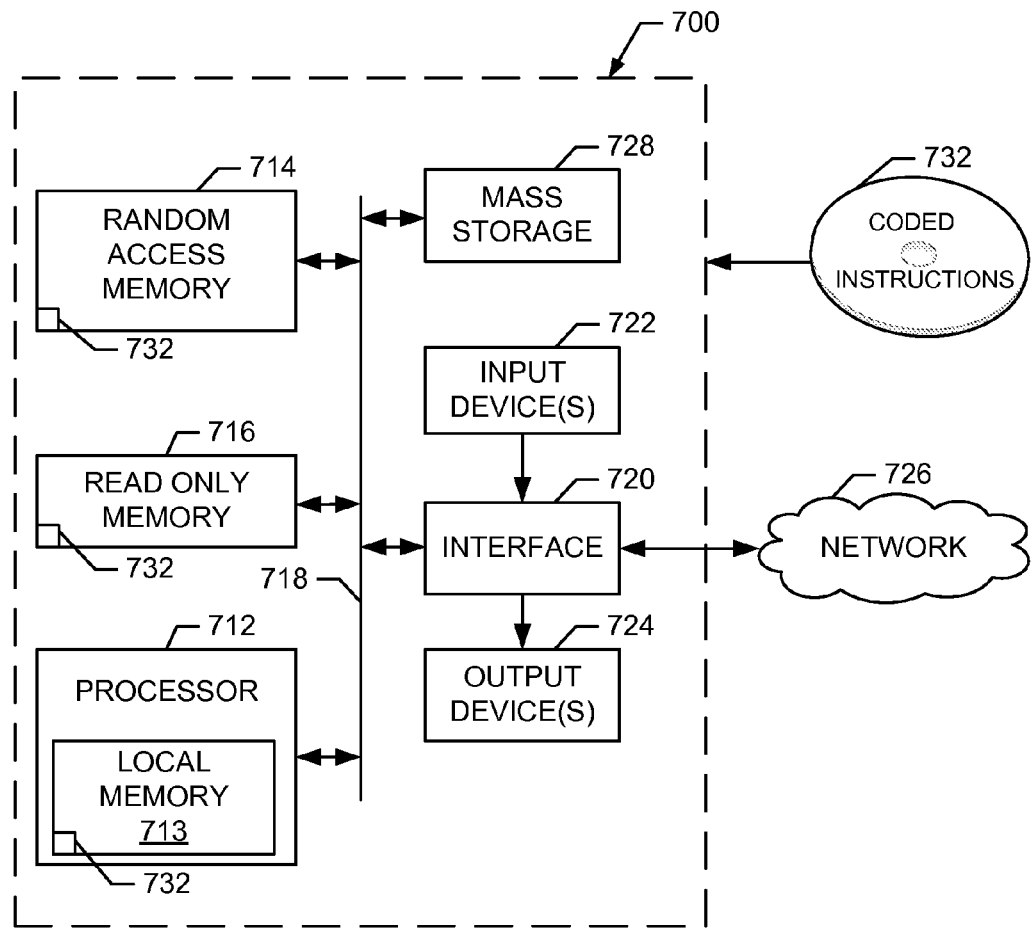
FIG. 7 is a block diagram of an example processor platform that may be used to execute the instructions of FIGS. 4, 5, and/or 6 to implement the example media identifying meter 106 of FIG. 2, the example spillover manager of FIG. 3, and/or, more generally, the example system of FIG. 1.

FIG. 7 is a block diagram of an example processor platform 700 capable of executing the instructions of FIGS. 4, 5, and 6 to implement the media identifying meter 106, 112 of FIGS. 1 and 2 and the spillover manager 102 of FIGS. 1 and 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and 6 may be stored in the mass storage device 728, in the volatile memory 714, in the non-volatile memory 716, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to reduce crediting errors due to spillover in a media measuring system, comprising:
    determining if first media monitoring data provided from a first meter identifies a same media as second media monitoring data provided from a second meter, the first meter and the second meter to monitor presented media at respective different locations;
    if the first media monitoring data identifies the same media as the second media monitoring data, detecting if spillover occurred by determining if an absolute value of a difference between a first timestamp associated with the first media monitoring data and a second timestamp associated with the second media monitoring data is less than a threshold; and
    if spillover occurred, determining which of the first media monitoring data or the second media monitoring data to credit as a media exposure.

2. The method of claim 1, wherein the threshold is a first time less than a second time that it takes an audio signal to travel to the first meter from a media presentation device associated with the second meter.

3. The method of claim 1, further including crediting both the first media monitoring data and the second media monitoring data if the first media monitoring data does not identify the same media as the second media monitoring data.

4. The method of claim 1, wherein determining whether to credit the first media monitoring data or the second media monitoring data includes:
    comparing the first timestamp of the first media monitoring data to the second timestamp of the second media monitoring data; and
    determining if the first timestamp is earlier than the second timestamp.

5. The method of claim 4, further including crediting the first media monitoring data and not crediting the second media monitoring data if the first timestamp is earlier than the second timestamp.

6. The method of claim 4, further including crediting the second media monitoring data and not crediting the first media monitoring data if the first timestamp is later than the second timestamp.

7. The method of claim 5, further including discarding the second media monitoring data.

8. The method of claim 5, further including marking the second media monitoring data as not credited.

9. The method of claim 5, wherein crediting the first media monitoring data as the media exposure includes marking the first media monitoring data as credited.

10. The method of claim 9, further including transmitting the marked first media monitoring data to a central facility.

11. A spillover manager to reduce crediting errors due to spillover in a media measuring system, comprising:
a media comparator to:
determine if first media detected by a first meter is equivalent to second media detected by a second meter, the first meter and the second meter to monitor presented media at different locations; and
if the first media is not equivalent to the second media, determine that spillover did not occur; and
a timestamp comparator to determine whether spillover occurred by determining if an absolute value of a difference between a first timestamp associated with the first media detected by the first meter and a second timestamp associated with the second media detected by the second meter is less than a threshold and to determine which of the first media or the second media to credit as a media exposure.

12. The spillover manager of claim 11, wherein the first media is equivalent to the second media if the first media and the second media are a same media.

13. The spillover manager of claim 11, further including a media creditor to credit both the first media and the second media if the media comparator determines the first media is not equivalent to the second media.

14. The spillover manager of claim 11, wherein to credit the first media as the media exposure, the media creditor is to label the first media monitoring data corresponding to the first media as credited.

15. The spillover manager of claim 14, further including a transmitter to transmit the labeled first media monitoring data to a central facility.

16. The spillover manager of claim 11, wherein to determine whether to credit the first media or the second media, the timestamp comparator is to:
compare the first timestamp of the first media to the second timestamp of the second media; and
determine if the first timestamp is earlier than the second timestamp.

17. The spillover manager of claim 16, further including a media creditor to credit the first media and not credit the second media if the first timestamp is earlier than the second timestamp.

18. The spillover manager of claim 17, wherein the media creditor is to credit the second media and not credit the first media if the first timestamp is later than the second timestamp.

19. The spillover manager of claim 17, wherein the media creditor is to discard media monitoring data corresponding to the second media.

20. The spillover manager of claim 17, wherein the media creditor is to label media monitoring data corresponding to the second media as not credited.

21. A tangible computer readable storage medium comprising instructions that, when executed, cause a computing device to at least:
determine if first media monitoring data provided from a first meter identifies a same media as second media monitoring data provided from a second meter, the first meter and the second meter to monitor presented media at respective different locations;
if the first media monitoring data identifies the same media as the second media monitoring data, detect if spillover occurred by determining if an absolute value of a difference between a first timestamp associated with the first media monitoring data and a second timestamp associated with the second media monitoring data is less than a threshold; and
if spillover occurred, determine which of the first media monitoring data or the second media monitoring data to credit as a media exposure.

22. The computer readable medium of claim 21, wherein the threshold is a first time less than a second time that it takes an audio signal to travel to the first meter from a media presentation device associated with the second meter.

23. The computer readable medium of claim 21, wherein the instructions cause the computing device to credit both the first media monitoring data and the second media monitoring data if the first media monitoring data does not identify the same media as the second media monitoring data.

24. The computer readable medium of claim 21, wherein the instructions cause the computing device to determine whether to credit the first media monitoring data or the second media monitoring data by:
comparing the first timestamp of the first media monitoring data to the second timestamp of the second media monitoring data; and
determining if the first timestamp is earlier than the second timestamp.

25. The computer readable medium of claim 24, wherein the instructions cause the computing device to credit the first media monitoring data and to not credit the second media monitoring data if the first timestamp is earlier than the second timestamp.

26. The computer readable medium of claim 24, wherein the instructions cause the computing device to credit the second media monitoring data and to not credit the first media monitoring data if the first timestamp is later than the second timestamp.

27. The computer readable medium of claim 25, wherein the instructions cause the computing device to discard the second media monitoring data.

28. The computer readable medium of claim 25, wherein the instructions cause the computing device to mark the second media monitoring data as not credited.

29. The computer readable medium of claim 25, wherein crediting the first media monitoring data as the media exposure includes marking the first media monitoring data as credited.

30. The computer readable medium of claim 29, wherein the instructions cause the computing device to transmit the marked first media monitoring data to a central facility.

* * * * *